US012440419B2

(12) United States Patent
Wang

(10) Patent No.: US 12,440,419 B2
(45) Date of Patent: Oct. 14, 2025

(54) SEXUAL STIMULATION DEVICE

(71) Applicant: Dongguan Mimao Electronic Technology Co., Ltd., Guangdong (CN)

(72) Inventor: Qinling Wang, Guangdong (CN)

(73) Assignee: Dongguan Mimao Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 18/926,836

(22) Filed: Oct. 25, 2024

(65) Prior Publication Data

US 2025/0161148 A1 May 22, 2025

Related U.S. Application Data

(63) Continuation-in-part of application No. 18/516,984, filed on Nov. 22, 2023, now Pat. No. 12,161,598.

(30) Foreign Application Priority Data

Sep. 24, 2024 (CN) ......................... 202411339759.2
Sep. 24, 2024 (CN) ......................... 202422335483.2

(51) Int. Cl.
*A61H 19/00* (2006.01)
*A61H 7/00* (2006.01)
*A61H 23/02* (2006.01)

(52) U.S. Cl.
CPC ............. *A61H 19/32* (2013.01); *A61H 7/004* (2013.01); *A61H 23/0254* (2013.01);
(Continued)

(58) Field of Classification Search
CPC ........ A61H 19/00; A61H 19/30; A61H 19/32; A61H 7/00; A61H 7/002; A61H 7/003;
(Continued)

(56) References Cited

U.S. PATENT DOCUMENTS 7,153,282 B1 12/2006 Dudley
8,409,120 B2 4/2013 Knyrim
(Continued)

FOREIGN PATENT DOCUMENTS

CN 104352254 A 2/2015
CN 106344382 A 1/2017
(Continued)

OTHER PUBLICATIONS

Non-Final Rejection dated Mar. 20, 2024 for U.S. Appl. No. 18/516,984 which is the parent application of the instant application.

(Continued)

*Primary Examiner* — Colin W Stuart
(74) *Attorney, Agent, or Firm* — ScienBiziP, P.C.

(57) ABSTRACT

The present disclosure provides a sexual stimulation device including: a housing, a driving unit, a first stimulation module and a second stimulation module; the first stimulation module includes a pair of first swinging pieces coupled to the driving unit, wherein the pair of first swinging pieces of the first stimulation module are driven to move toward or away from each other reciprocally, and the second stimulation module is driven to slide reciprocally to toward or away from the first stimulation module under the drive of the driving unit, so that the penis can simultaneously obtain the stimulation effect of pressing, releasing and sliding.

19 Claims, 16 Drawing Sheets

(52) U.S. Cl.
CPC .. *A61H 2201/1215* (2013.01); *A61H 2201/14* (2013.01); *A61H 2201/1669* (2013.01); *A61H 2201/1676* (2013.01)

(58) Field of Classification Search
CPC ........ A61H 7/004; A61H 7/005; A61H 7/007; A61H 23/0254; A61H 2201/1215; A61H 2201/14; A61H 2201/1436; A61H 2201/149; A61H 2201/1664; A61H 2201/1669; A61H 2201/1676; A61H 2201/1678
See application file for complete search history.

(56) References Cited

U.S. PATENT DOCUMENTS

| | | | | |
|---|---|---|---|---|
| 9,138,373 | B2 | 9/2015 | Caropelo et al. | |
| 10,660,620 | B2 | 5/2020 | Wu | |
| 11,369,545 | B1 | 6/2022 | He | |
| 11,491,078 | B1 | 11/2022 | He | |
| 11,554,073 | B1 | 1/2023 | Guo | |
| 11,583,468 | B2 | 2/2023 | Barkay | |
| 11,633,327 | B1 | 4/2023 | Wu et al. | |
| 11,752,063 | B1 * | 9/2023 | Huang | A61H 19/32 600/38 |
| 11,806,306 | B1 | 11/2023 | Guo | |
| 2009/0099413 | A1 * | 4/2009 | Kobashikawa | A61H 19/44 600/38 |
| 2015/0065792 | A1 | 3/2015 | Levine | |
| 2017/0007496 | A1 * | 1/2017 | Cambridge | A61H 19/32 |
| 2017/0071819 | A1 * | 3/2017 | Chen | A61H 19/44 |
| 2019/0125624 | A1 | 5/2019 | DeVore | |
| 2020/0368103 | A1 | 11/2020 | Rakshit et al. | |
| 2021/0196556 | A1 | 7/2021 | Fuster | |
| 2023/0080795 | A1 * | 3/2023 | Raju | A61H 9/005 600/38 |
| 2023/0126338 | A1 * | 4/2023 | Shao | A61H 15/0078 600/38 |
| 2023/0210718 | A1 * | 7/2023 | Zhou | A61H 19/32 600/38 |
| 2024/0099930 | A1 * | 3/2024 | Luo | A61H 7/00 |

FOREIGN PATENT DOCUMENTS

| | | | | | |
|---|---|---|---|---|---|
| CN | 107551410 | A | | 1/2018 | |
| CN | 210872865 | U | | 6/2020 | |
| CN | 211584149 | U | | 9/2020 | |
| JP | 2010125335 | A | | 6/2010 | |
| JP | 5761836 | B1 | * | 8/2015 | A61H 19/30 |
| JP | 2020081721 | A | | 6/2020 | |
| KR | 101310270 | B1 | | 9/2013 | |

OTHER PUBLICATIONS

Final Rejection dated Jun. 20, 2024 for U.S. Appl. No. 18/516,984 which is the parent application of the instant application.

International Search Report dated Mar. 19, 2025 for International Application No. PCT/CN2024/134000 which is the family application of the instant application.

Notification of reasons for refusal dated Feb. 18, 2025 for JP Patent Application No. 2024-202360 which is the family application of the instant application.

Written Opinion of the International Searching Authority dated Mar. 19, 2025 for International Application No. PCT/CN2024/134000 which is the family application of the instant application.

Notification of reasons for refusal dated Jan. 28, 2025 for JP Patent Application No. 2024-203424 which is the family application of the instant application.

Notification of reasons for refusal dated Dec. 17, 2024 for JP Patent Application No. 2024-201869 which is the family application of the instant application.

Office Action dated Apr. 10, 2025 for EP Patent Application No. 24214864.1 which is the family application of the instant application.

* cited by examiner

SEXUAL STIMULATION DEVICE

RELATED APPLICATIONS

This is a continuation-in-part of U.S. application Ser. No. 18/516,984, filed Nov. 22, 2023, which claims priority to China Patent Application No. 202411339759.2, filed on Sep. 24, 2024, and China Patent Application No. 202422335483.2, filed on Sep. 24, 2024, disclosures of each of which are hereby incorporated by reference in their entirety.

TECHNICAL FIELD

The present disclosure relates to the technical field of sexual stimulation, and in particular, to a sexual stimulation device.

BACKGROUND

In recent years, adult sex products are developed to help users to release their sex pressure. Generally, a vibration motor is used for a conventional sex toy to provide vibrations on the user's sensitive areas, such as the female genitalia, the male genitalia or the like. However, the stimulation effects of the conventional sex toys may not meet the user's needs.

BRIEF DESCRIPTION OF DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DETAILED DESCRIPTION

Figure 1:
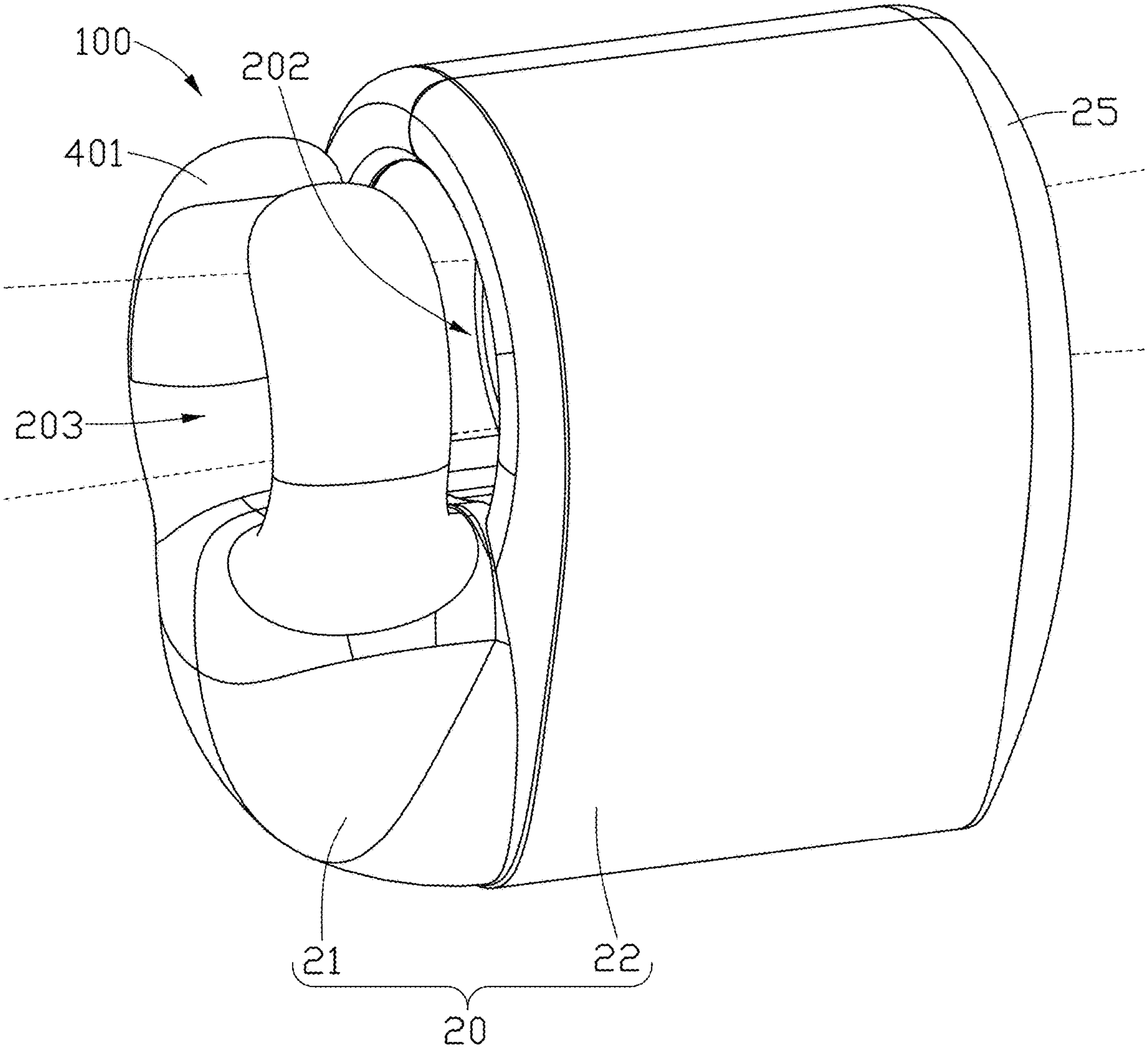
FIG. 1 is a perspective view of a sexual stimulation device according to a first embodiment of the present disclosure.

As shown in FIG. 1, a first embodiment of the present disclosure provides a sexual stimulation device 100, which is capable of stimulating the male genital organ.

Figure 2:
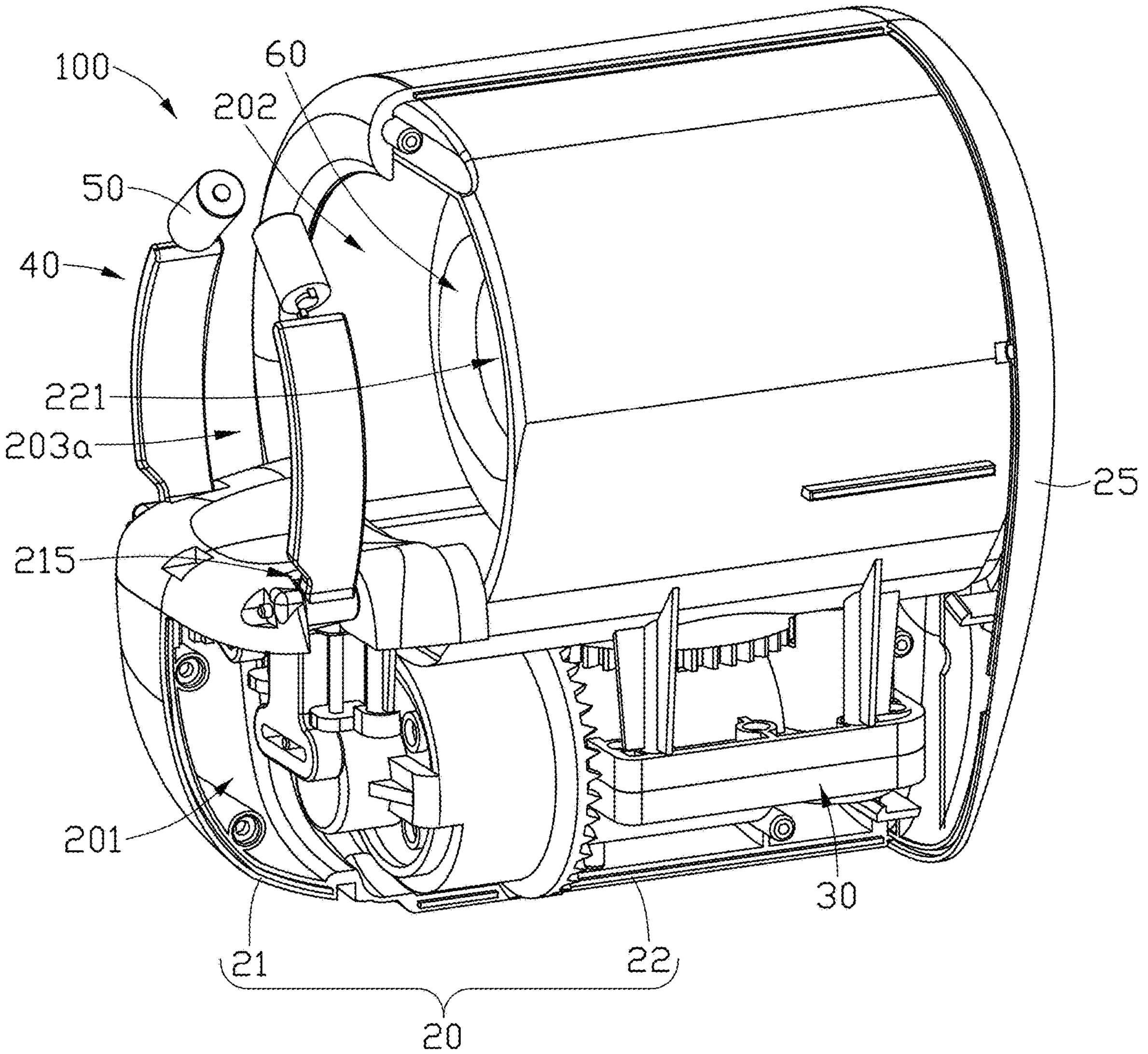
FIG. 2 is a perspective view of a portion of the sexual stimulation device shown in FIG. 1 with a housing being partly removed.
Figure 3:
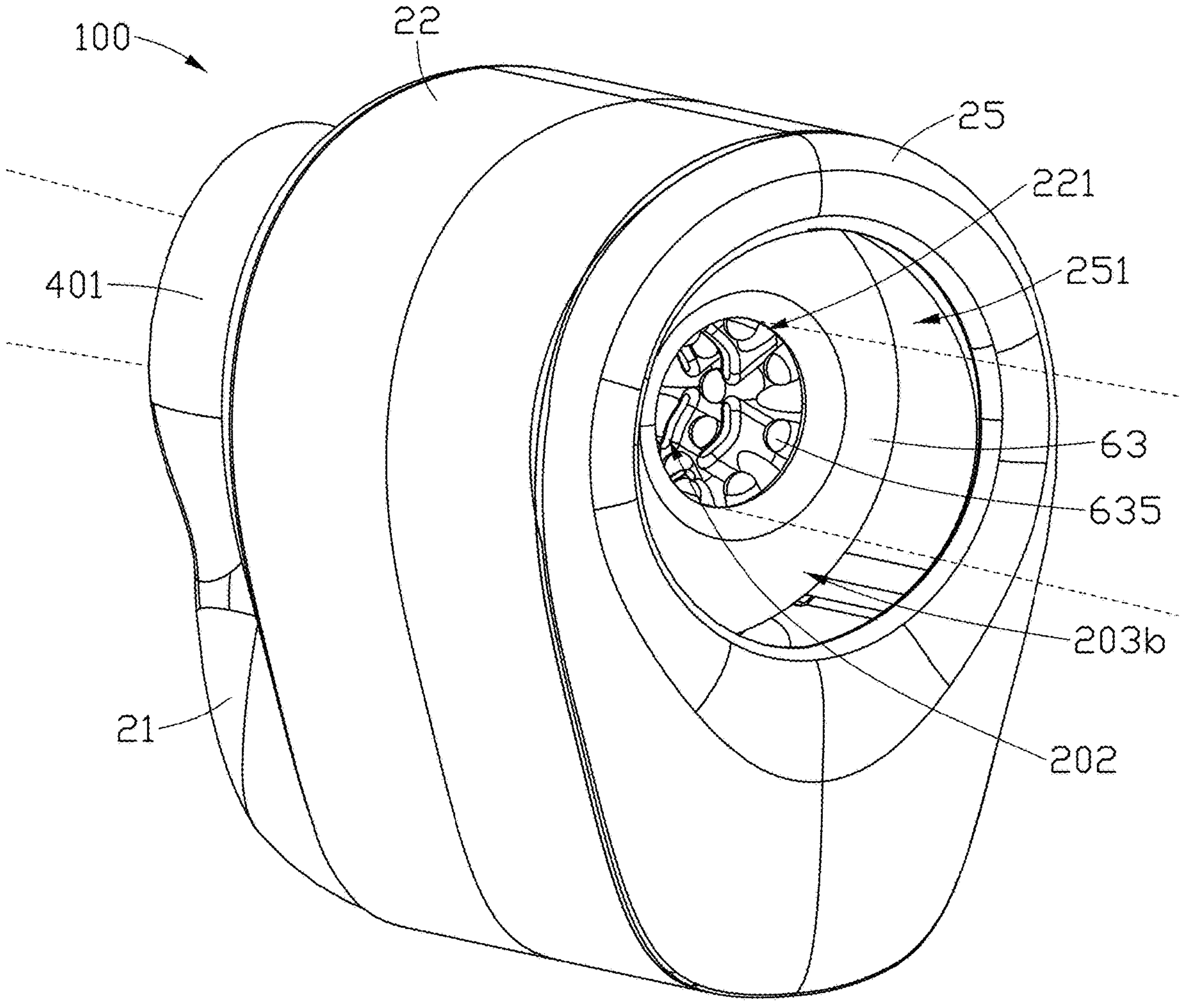
FIG. 3 is a perspective view of the sexual stimulation device shown in FIG. 1 showing from another viewing direction.
Figure 4:
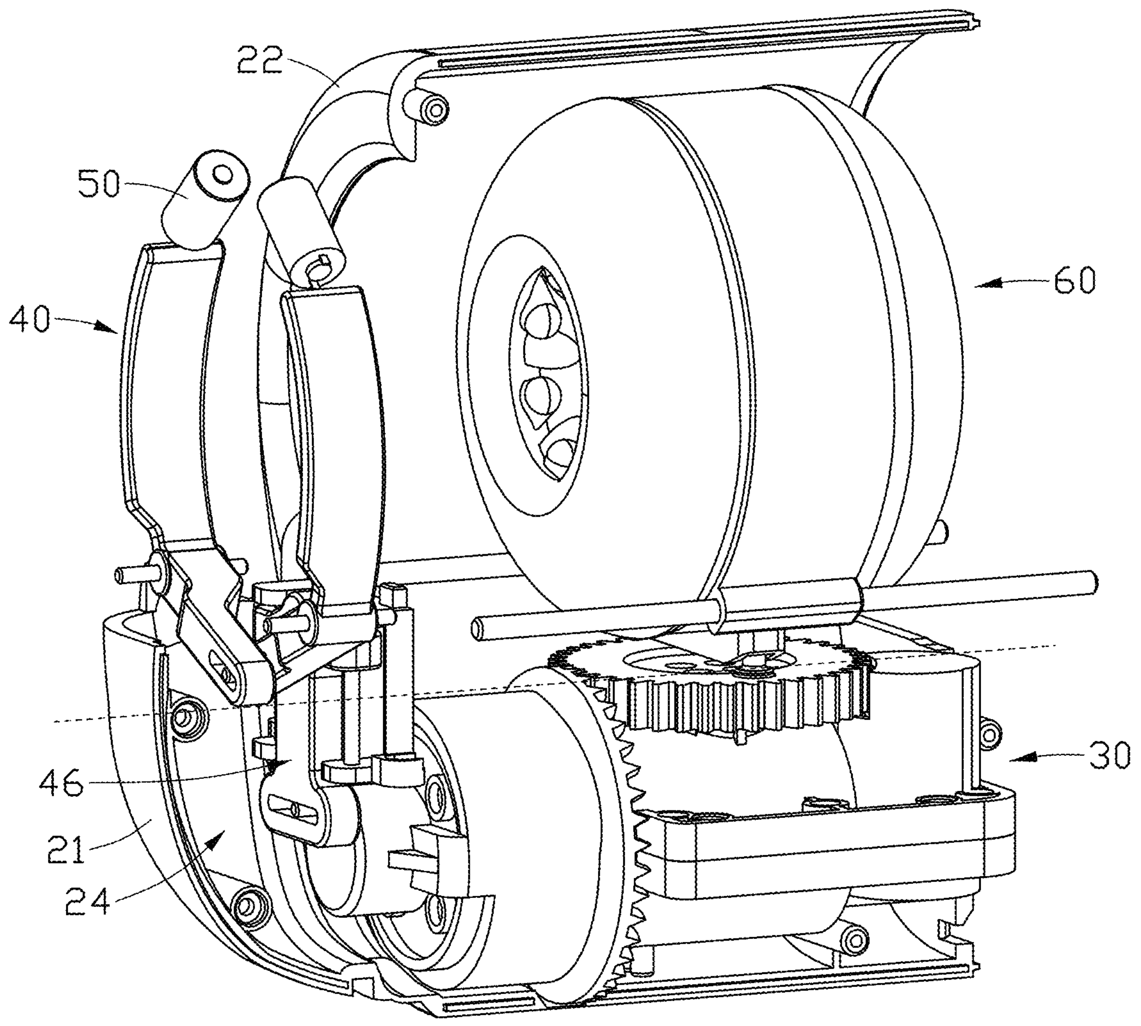
FIG. 4 is a perspective view of the sexual stimulation device shown in FIG. 3 with the housing being partly removed.
Figure 5:
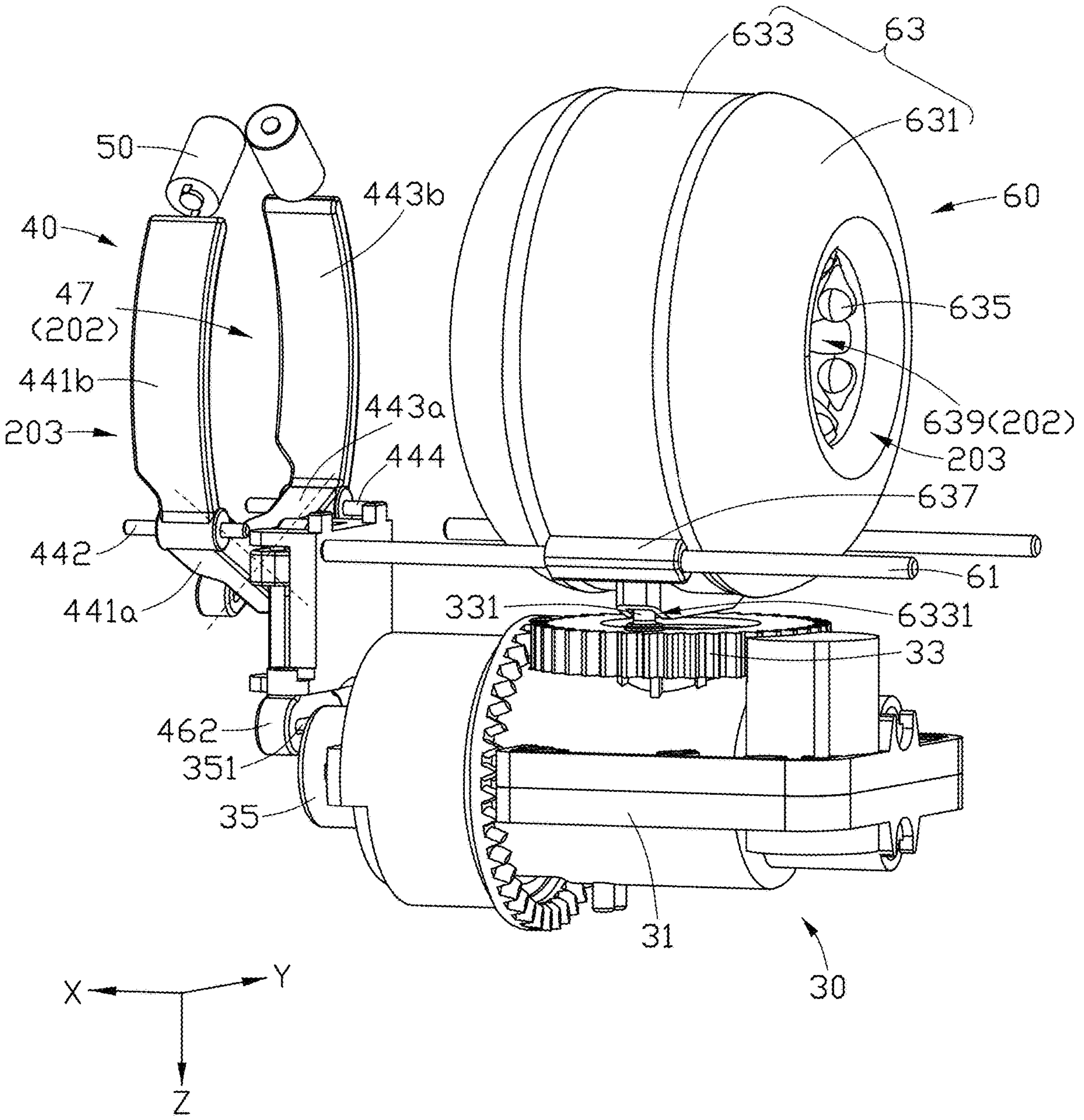
FIG. 5 is a perspective view of the sexual stimulation device shown in FIG. 3 with the housing being removed.

Refer to FIG. 1 to FIG. 3, the sexual stimulation device 100 comprises a housing 20, a driving unit 30, a first stimulation module 40 and a second stimulation module 60. The driving unit 30, the first stimulation module 40 and the second stimulation module 60 are received in the housing 20. The first stimulation module 40 and the second stimulation module 60 are coupled to the driving unit 30 so as to be driven by the driving unit 30. The first stimulation module 40 and the second stimulation module 60 cooperatively define an insertion space 202 for allowing the male genitalia to be inserted. Meanwhile, at least one insertion hole 203 is defined in at least one of the first stimulation module 40 and the second stimulation module 60. The at least one insertion hole 203 is air communicated with the insertion space 202, so that the male genitalia is insertable into the insertion space 202 through the least one insertion hole 203.

In this embodiment, the first stimulation module 40 and the second stimulation module 60 are arranged along an imaginary line, e.g. Y-direction. The imaginary line is parallel to or overlapped with an extending direction of the first stimulation module 40, such as a length direction of the first stimulation module 40. The male penis is capable of being inserted into the first stimulation module 40 and the second stimulation module 60 along the imaginary line. Specifically, the at least one insertion hole 203 has a first insertion hole **203*a* in an end of the first stimulation module 40 and a second insertion hole 203*b* in an end of the second stimulation module 60. The first insertion hole 203*a* and the second insertion hole 203*b* are arranged at two opposite sides of the sexual stimulation device 100 along the imaginary line. Anyone of the first insertion hole 203*a* and the second insertion hole 203*b* is selectable to be an entrance for entering the insertion space 202**.

A vibration stimulation module (e.g. a vibration motor) is received in either the first stimulation module 40 or the second stimulation module 60, which is capable of stimulating the penis inserted into the insertion space 202.

The housing 20 comprises a first housing body 21 and a second housing body 22 fixedly installed to one side of the first housing body 21. The first housing body 21 and the second housing body 22 are arranged along the imaginary line. The bottoms of the first housing body 21 and the second housing body 22 are interconnected to cooperatively define a receiving space 201 for receiving the driving unit 30. The first stimulation module 40 is at least partly received in the first housing body 21, and the second stimulation module 60 is received in the second housing body 22.

A first opening 215 is defined in a top side of the first housing body 21, which air communicates with the receiving space 201. A channel 221 is defined to penetrate through the second housing body 22 along the imaginary line.

The housing 20 further includes a cover 25, which is detachably installed on a distal end of the second housing body 22 which is away from the first housing body 21. An opening 251 is defined in the cover 25, the opening 251 is air communicated to the channel 221 along the imaginary line.

As shown in FIG. 4 to FIG. 8, the driving unit 30 is received in the receiving space 201. The driving unit 30 comprises a driving member 31, a rotating member 33, a transmission member 35, and a transmission post 39. An output shaft 311 is extended from an end of the driving member 31. The rotating member 33 is coupled to the output shaft 311 by transmission of the transmission post 39. The rotating member 33 engages with the second stimulation module 60 so that the second stimulation module 60 is driven to do motions. The transmission member 35 is engaged to the rotating member 33 and the first stimulation module 40 so that the first stimulation module 40 is driven to do motions.

In the first embodiment, the rotating member 33 may be a gear wheel. The driving member 31 may be a motor. The output shaft 311 is protruded from one end of the motor 31 along the length direction of the housing 20. A spiral structure is defined in a periphery surface of the output shaft 311. The transmission post 39 is vertical to the output shaft 311 with the spiral structure of the output shaft 311 being engaged with the transmission post 39. The transmission post 39 is rotatably mounted in the second housing body 22. A meshing mechanism 391 (refer to FIG. 8) is formed on the transmission post 39. The meshing mechanism 391 not only meshes with the rotating member 33, but also meshes with the output shaft 311, thereby the meshing mechanism 391 and the rotating member 33 are driven to rotate by the output shaft 311.

An rod 331 is protruded from a location which is distant from the center of the rotating member 33 at the side opposite to the driving member 31, which is used to connect with the second stimulation module 60, thereby driving the second stimulation module 60 to stimulate the penis.

The transmission member 35 is installed on one end of the driving member 31 and meshed with the rotating member 33, thereby transmitting the driving force from the driving member 31 to the transmission member 35 via the rotating member 33, so that only one driving member 31 is used to achieve force transmission for the transmission member 35 and the rotating member 33.

A rotating shaft 351 is extended from the end of the transmission member 35 at a location which is away from the driving member 31. The rotating shaft 351 is used to drive the first stimulation module 40 to perform opening and closing swinging motions. The rotating shaft 351 is an eccentric structure which is protruded from a position distant from the center of the transmission member 35. A gearing structure is formed at the peripheral of the end of the transmission member 35 distant from the rotating shaft 351 and is compatible with the meshing mechanism of the rotating member 33. When the driving member 31 is activated, the output shaft 311 is rotated accordingly and the rotating member 33 is driven to rotate. The rotating member 33 and the transmission member 35 are meshed and rotated together, so that the second stimulation module 60 and the first stimulation module 40 are driven to move simultaneously. Thereby, the sexual stimulation device 100 simultaneously achieves the reciprocating opening and closing motions of the first stimulation module 40 and the sliding motions of the second stimulation module 60 by using one motor.

Figure 6:
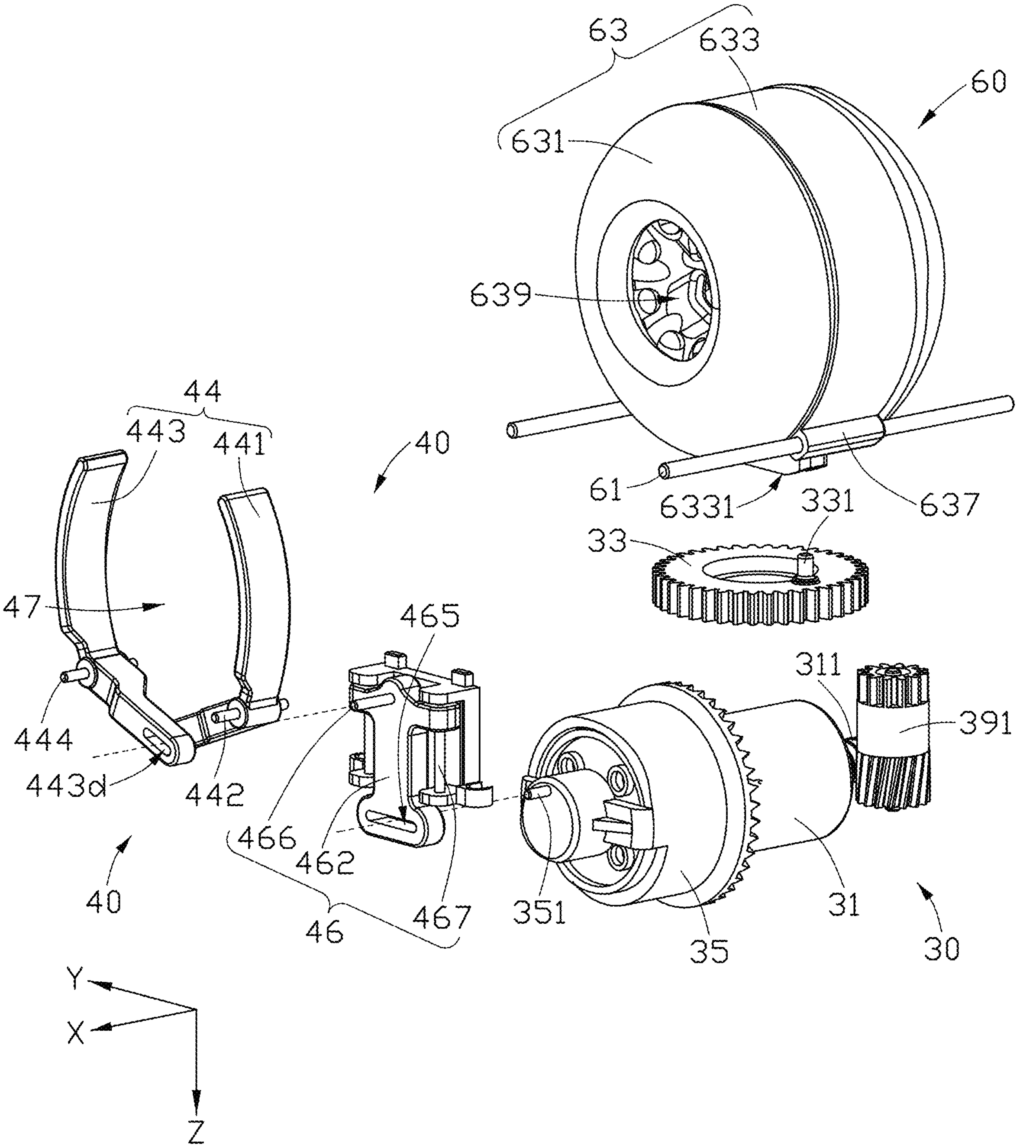
FIG. 6 is an exploded view of the sexual stimulation device shown in FIG. 5.

Refer to FIG. 2 and FIG. 6, specifically, a portion of the first stimulation module 40 is extended outwardly through the first opening 215 of the first housing body 21. Another portion of the first stimulation module 40 is coupled to the transmission member 35 of the driving unit 30. The first stimulation module 40 comprises a swinging unit 44 and a transmission unit 46. One end of the transmission unit 46 is rotatably connected to the rotating shaft 351, thereby driving the swinging unit 44 to perform reciprocating opening and closing swinging motions.

Figure 7:
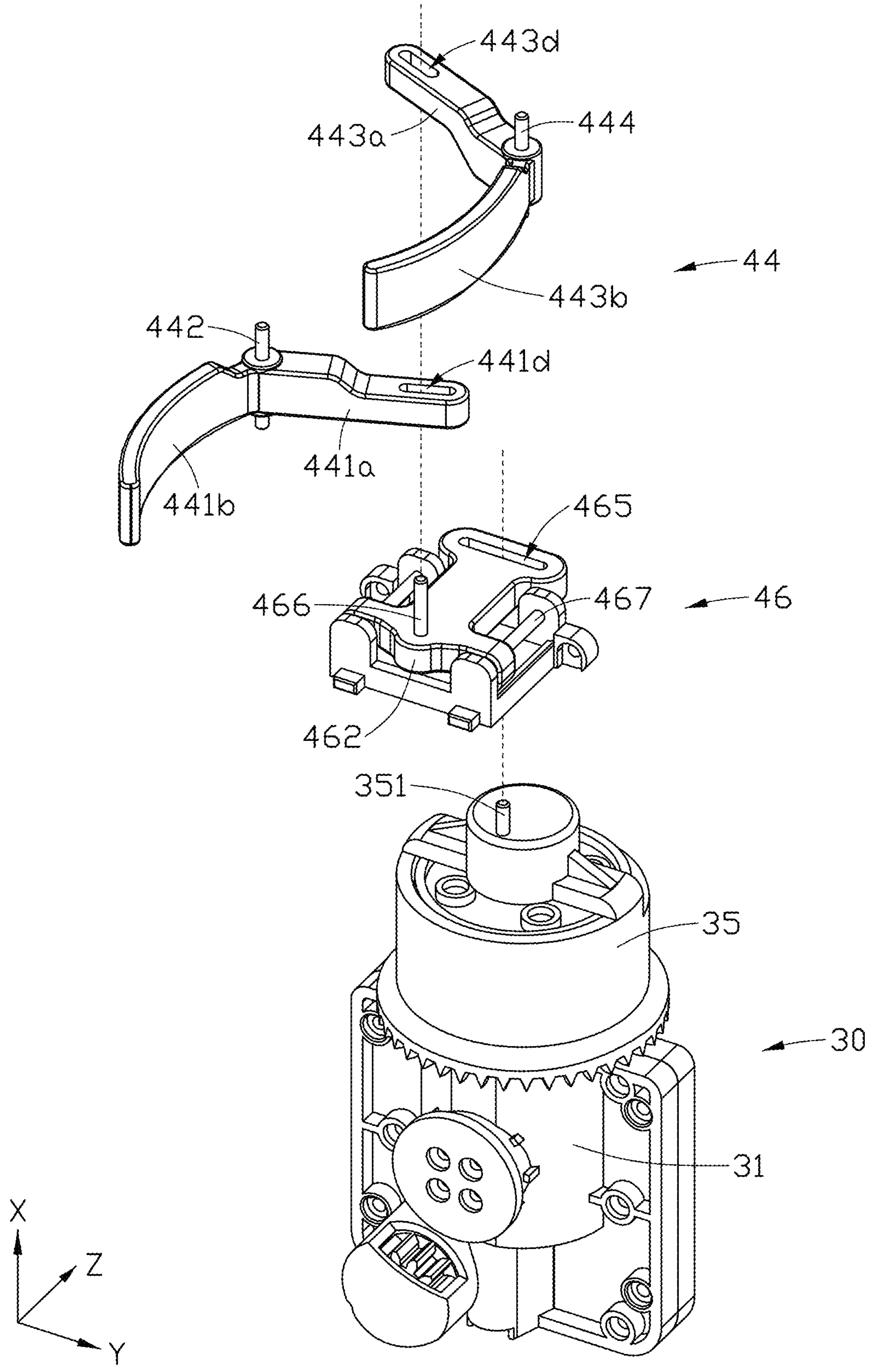
FIG. 7 is an exploded view of a driving unit and a main stimulation of the sexual stimulation device shown in FIG. 6 showing from another viewing direction.
Figure 8:
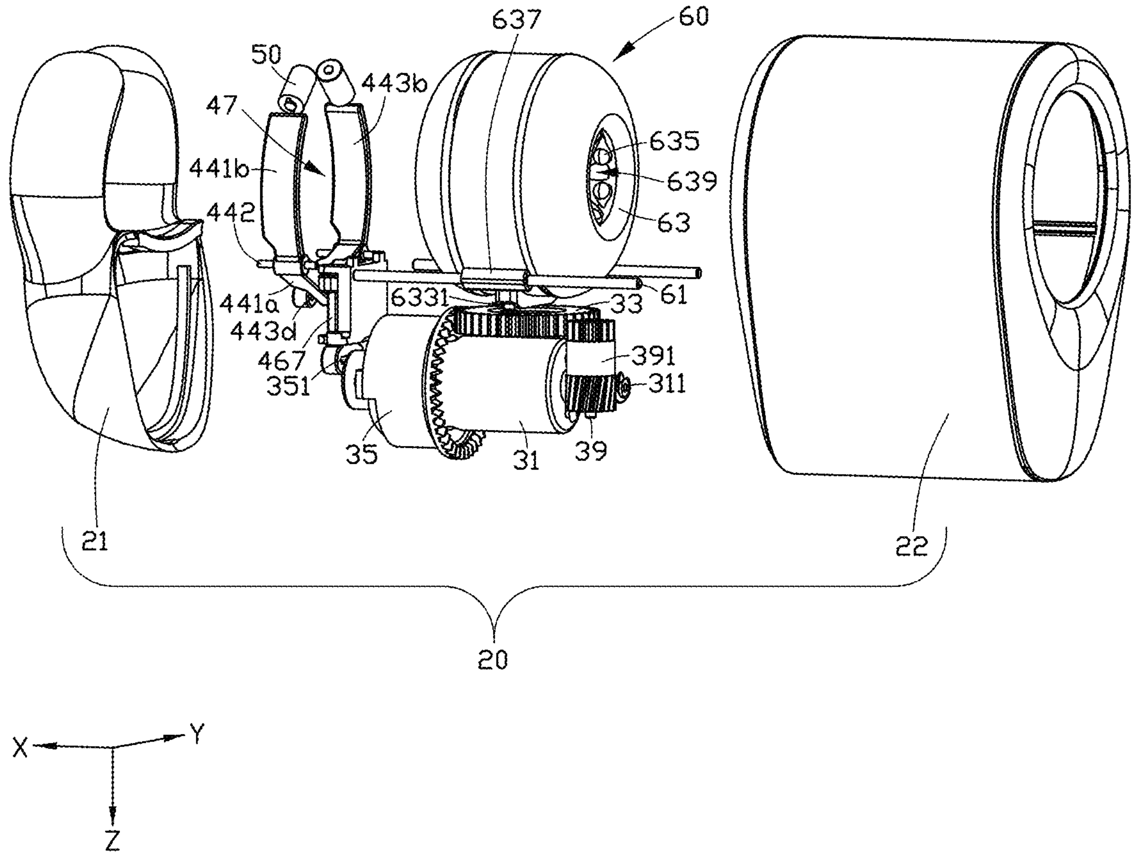
FIG. 8 is an exploded view of the sexual stimulation device shown in FIG. 1 with a first housing body and a second housing body being separated.

Refer to FIG. 6 to FIG. 8, the swinging unit 44 comprises a first swinging piece 441 and a second swinging piece 443 arranged symmetrically and spaced apart from each other. An accommodation space 47 is defined between the first swinging piece 441 and the second swinging piece 443 for accommodating the penis. the shape of the inner wall of the accommodation space 47 is configured to fit the shape of the penis. Specifically, the accommodation space 47 is a portion of the insertion space 202.

During the operation of the driving member 31, the first swinging piece 441 and the second swinging piece 443 are driven and switched between two motion modes e.g. a first mode and a second mode. In the first mode, the first swinging piece 441 and the second swinging piece 443 are driven to rotate towards each other at a plane which is perpendicular to the imaginary line so as to compress the accommodation space 47. Therefore, an effect of gripping the penis is provided. In the second mode, the first swinging piece 441 and the second swinging piece 443 are driven to rotate in the directions opposite to that in the first mode so as to expand the accommodation space 47. Therefore, an effect of releasing the penis is provided. The two modes are switched reciprocally to provide a strong stimulus effect for the penis in the accommodation space 47. The first insertion hole 203*a* is surrounded by the first swinging piece 441 and the second swinging piece 443 at a side of the accommodation space 47. The accommodation space 47 is air communicated with the channel 221 of the second housing body 22 (refer to FIG. 2), and the first insertion hole 203, thereby allowing the penis to be inserted into the accommodation space 47 from the first insertion hole 203*a*. Alternatively, the penis can be inserted by entering from the opening 251 of the cover 25 (refer to FIG. 3), passing through the channel 221 of the second housing body 22 into the accommodation space 47.

Refer to FIG. 7 to FIG. 8, the first swinging piece 441 is an L-shaped structure, which comprises a first connecting arm 441*a* and a first swinging arm 441*b* that are formed as a single piece element. The first connecting arm 441*a* is strip-shaped, and the first swinging arm 441*b* is bent and curved from one end of the first connecting arm 441*a*. The first swinging arm 441*b* is an arc-shaped structure, so that the accommodation space 47 defined by the first swinging arm is circular. A first groove 441*d* is defined in the end of the first connecting arm 441*a* which is far away from the first swinging arm 441*b*. The first groove 441*d* is strip-shaped extending along the extending direction of the first connecting arm 441*a*. The first connecting arm 441*a* is engaged with the transmission unit 46 through the first groove 441*d*. The first swinging arm 441*b* extends out of the first opening 215 of the first housing body 21 (refer to FIG. 2). The second swinging piece 443 has a similar structure to the first swinging piece 441. The end of the first connecting arm 441*a* at which the first groove 441*d* is disposed is overlapped with that of the second swinging piece 443 at the extending direction of the imaginary line.

The first connecting arm 441*a* and the first swinging arm 441*b* are rotatably attached to the inner wall of the first housing body 21 via a first pivot 442. In the first mode, driven by the rotating shaft 351, the transmission unit 46 engages with the first groove 441*d* to drive the first connecting arm 441*a* to move downwardly. The first swinging arm 441*b* of the first swinging piece 441 moves closer to the second swinging piece 443. Then, in the second mode, the transmission unit 46 engages with the first groove 441*d* to drive the first connecting arm 441*a* to move upward, the first swinging arm 441*b* of the first swinging piece 441 then moves away from the second swinging piece 443.

In this embodiment, the first swinging arm 441*b* is covered with a protective cover 401 (refer to FIG. 1). Moreover, the second swinging arm 443*b* of the second swinging piece 443 is covered by another protective cover 401, or the first swing arm 441*b*, the second swing arm 443*b*, and the first housing body 21 can be covered by a single protective cover 401.

A vibration portion 50 is provided in the protective cover 401 and close to a top of the first swinging arm 441*b* (refer to FIG. 2), so the first swinging arm 441*b* can be vibrated and swung simultaneously. In this embodiment, the first housing body 21 and the second housing body 22, the first swinging piece 441, and the second swinging piece 443 are made of a hard material, such as hard plastic. The protective cover 401 is made of a soft silicone material which has a smaller hardness than that of the hard material.

In this embodiment, the structure of the second swinging piece 443 is similar as that of the first swinging piece 441. The second swinging piece 443 includes a second swinging arm 443*b* and a second connecting arm 443*a* that are formed as one piece.

The second connecting arm 443*a* and the second swing arm 443*b* is rotatably attached to the inner wall of the first housing body 21 via second pivot 444. A second groove 443*d* is defined in one end of the second connecting arm 443*a* which is away from the second swinging arm 443*b*. The second groove 443*d* has a strip-shape along the extending direction of the second connecting arm 443*a*. The second connecting arm 443*a* is coupled to the transmission unit 46 by the engagement of the second groove 443*d*, so that under the drive of the rotating shaft 351, the transmission unit 46 drives the second connecting arm 443*a* to move downward, or the transmission unit 46 drives the second connecting arm 443*a* to move upward. The second swing arm 443*b* is driven to swing back and forth.

In this embodiment, the first swinging piece 441 and the second swinging piece 443 are shaped like two fingers. When the first swinging piece 441 and the second swinging piece 443 move toward each other, the free ends of the protective cover 401 of the first swinging piece 441 and the second swinging piece 443 may contact each other. It can also be understood that when the first swinging piece 441 and the second swinging piece 443 move to most close positions, the free ends of the protective covers 401 of the first swinging piece 441 and the second swinging piece 443 may not contact each other but have a gap between them.

Refer to FIG. 6 to FIG. 8, the driving member 31 is a rotary motor, and the transmission unit 46 is configured to convert the rotation of the rotating shaft 351 into a reciprocal motion along the up-and-down direction, so the first and second connecting arms 441*a*, 443*a* are driven to move toward or away from each other.

Specifically, the transmission unit 46 includes a sliding block 462, a driving shaft 466, and a guide pole 467. The guide pole 467 is fixedly installed in the first housing body 21 and positioned near to the first opening 215. The sliding block 462 is attached to the guide pole 467 and slidable along the guide pole 467. An end of the sliding block 462 which is away from the driving shaft 466 is connected to the rotating shaft 351 of the transmission member 35. One end of the driving shaft 466 is fixed to the sliding block 462, and the other end of the driving shaft 466 passes through the first groove 441*d* of the first connecting arm 441*a* and the second groove 443*d* of the second connecting arm 443*a*, thereby allowing the first connecting arm 441*a* and the second connecting arm 443*a* both be driven by the driving shaft 466. Under the drive of the driving member 31, the sliding block 462 is moved up and down along the length of the guide shaft 467. The first swinging piece 441 and the second swinging piece 443 are driven to move toward or away from each other by the driving shaft 466, thereby achieving a clamping massage effect for the penis.

More specifically, a sliding groove 465 is defined in the sliding block 462, which is disposed along the length direction of the sliding block 462. For example, extending in the Y-direction to form a strip groove. The rotating shaft 351 is inserted into the sliding groove 465, and slidable along the inner wall of the sliding groove 465 under the drive of the driving member 31, thereby the sliding block 462 is driven to slide up and down along the guide shaft 467, the first connecting arm 441*a* and the second connecting arm 443*a* are then driven to move close to or away from each other reciprocally by the driving shaft 466, achieving a reciprocating massage effect for the penis in the accommodation space 47.

The vibration unit 50 comprises at least one vibration motor, which is accommodated in the end of the first/second swinging arms away from the first/second connecting arms 441*a*, 443*a*. Specifically, in this embodiment, a first vibration motor is attached to the end of the first swinging arm 441*b* away from the first connecting arm 441*a*, and a second vibration motor is attached to the end of the second swinging arm 443*b* away from the second connecting arm 443*a*. Similarly, when a switch of the sexual stimulation device 100 is turned on, the vibration motors can operate simultaneously with the driving member 31 or independently, it based on preference. When the penis is received in the accommodation space 47, the sexual stimulation device 100 is then started, the two swinging arms move toward or away from each other, reciprocally tapping the penis. During this tapping process, the vibration motors drive the ends of the swinging arms to vibrate, enhancing the massage effect to the penis.

Refer to FIG. 2, FIG. 6 to FIG. 8, the second stimulation module 60 is accommodated in the second housing body 22. The second stimulation module 60 comprises a sliding guide 61 and a massage member 63 slidably arranged on the sliding guide 61. The sliding guide 61 is configured to extend along the X direction which is parallel to the insertion direction of the penis. The sliding guide 61 is fixedly disposed at the bottom side of the second housing body 22. The bottom of the massage member 63 is eccentrically connected to the rotating member 33 and is movably connected to the sliding rod 61, so that the rotation of the rotating member 33 is then converted to move along the length direction of the sliding member 61, which is perpendicular to the motion plane of the swinging arms of the first stimulation module 40.

As shown in FIG. 6 to FIG. 8, the massage member 63 is accommodated in the second housing body 22. The massage member 63 comprises a receiving portion 631 and a connecting member 633. In this embodiment, the receiving portion 631 is a cylindrical hollow structure with a massage space 639. Specifically, the massage space 639 is a portion of the insertion space 202. The connecting member 633 surrounds the middle of the outer circumference of the receiving portion 631. The receiving portion 631 is made of a soft rubber material with a low hardness than that of the connecting member 633. At least one protrusion 635 is projected from the inner wall of the massage space 639 inwardly. In this embodiment, there are several protrusions 635 surrounding the inner wall of the massage member 63 that are in contact with the penis, thereby further enhancing the massage effect. The massage space 639 is air communicated with the channel 221 (refer to FIG. 2) of the second housing body 22. The side of the massage space 639 opposite to the accommodation space 47 corresponds to the insertion hole 203. That is, the massage space 639, the insertion hole 203, and the channel 221 are air communicated with each other and along in the imaginary line.

Similarly, a vibration unit 50 is also accommodated in the inner wall of the receiving portion 631. The vibration unit 50 comprises at least one vibration motor, which further enhances the massage effect through vibration.

Furthermore, the receiving portion 631 and the first swinging arm 441*b* and the second swinging arm 443*b* are located along the imaginary line, so that the penis may first enter the massage space 639 through the open hole 251 of the cover 25, then enter the accommodation space between the two adjacent swinging arms 47, enabling the sexual stimulation device to simultaneously massage the penis in different directions and positions. Alternatively, the penis can first enter the accommodation space 47 between the two adjacent swinging arms, and then enter the channel 221 of the second housing body 22 and last enter the massage space 639 of the massage member 63.

The connecting member 633 is fixedly accommodated in the outer wall of the receiving portion 631. The connecting member 633 is slidably connected to the sliding guide 61. Under the drive of the driving member 31, the connecting member 633 slides along the sliding guide 61, so that the receiving portion 631 moves forwardly and backwardly in the second housing body 22.

A connecting shaft 637 is protruded from the outer circumference of the connecting member 633. The connecting shaft 637 is capable of sliding along the sliding guide 61. A sliding groove 6331 is protrusively defined in the bottom of the connecting member 633 near the eccentric lever 331. The sliding groove 6331 is a strip shape along the direction perpendicular to the length of the sliding guide 61, e.g. the Y direction. The eccentric lever 331 is fixed to the connecting member 633 in the Z direction. The eccentric lever 331 is inserted into the sliding groove 6331 and slidable along the sliding groove 6331 in the Y direction. Therefore, when the driving member 31 rotates, the output shaft 311 drives the rotating member 33 to rotate, the eccentric lever 331 is driven to move along the sliding groove 6331 in the Y direction, the connecting member 633 is then driven to slide in the sliding rod 61, thereby achieving the forward and backward reciprocal sliding motions of the second stimulation module 60 in the X direction driven by the driving unit 30.

Second Embodiment

Refer to FIG. 9 to FIG. 14, the sexual stimulation device 100 of the second embodiment differs from the sexual stimulation device 100 of the first embodiment in the structure of the swinging arms and the driving unit 30.

In this embodiment, the driving unit 30 comprises two driving members 31. The two driving members 31 are configured for controlling different massage modules respectively, so that the reciprocal swing motions of the first stimulation module 40 and the reciprocal sliding motions of the second stimulation module 60 can be performed independently.

Specifically, refer to FIG. 9 to FIG. 12, a driving member 31 is accommodated in the second housing body 22 along the length direction of the housing. The driving member 31 includes a first motor 36 and a second motor 38 arranged side by side. One end of the first motor 36 is equipped with a rotating shaft 351, which drives the reciprocal swing motions of the first stimulation module 40. The end of the second motor 38 opposite the rotating shaft 351 is connected to an output shaft 311, both of the rotating shaft 351 and the output shaft 311 are parallel to the length of the housing, that is, the X direction. The output shaft 311 drives the sliding motions of the second stimulation module 60 by meshing mechanism.

Specifically, one end of the output shaft 311 is connected to a first meshing member 65, which is a bevel gear. A fixed post 70 is disposed adjacent to the first meshing member 65. The fixed post 70 is fixedly installed in the second housing body 22 and is arranged perpendicular to the first meshing member 65. A second meshing member 67 and A third meshing member 69 are wound along the Z direction and rotatably installed onto the fixed post70. The end of the second meshing member 67 and the end of the third meshing member 69 are engaged, thereby allowing the third meshing member 69 to rotate simultaneously when the second meshing member 67 rotates.

In this embodiment, the third meshing member 69 is a cylindrical gear, and the second meshing member 67 is a bevel gear which compatible with the cylindrical gear. The first meshing member 65 meshes with the second meshing member 67. Thus, under the drive of the driving member 31, the output shaft 311 drives the first meshing member 65 to rotate, the first meshing member 65 then drives the second meshing member 67 to rotate by the meshing mechanism, the second meshing member 67 then drives the third meshing member 69 to rotate simultaneously.

A mounting pole 71 is disposed adjacent to the fixed post 70. The mounting pole 71 is rotatably installed in the second housing body 22. A fourth meshing member 711 is connected to the outer surface of the mounting pole 71. When the fourth meshing member 711 rotates, it synchronously drives the mounting pole 71 to rotate. In this embodiment, the fourth meshing member 711 is a cylindrical gear which is compatible with the third meshing member 69, that is to say, the third meshing member 69 meshes with the fourth meshing member 711. When the third meshing member 69 rotates, it synchronously drives the fourth meshing member 711 to rotate, the fourth meshing member 711 then drives the mounting pole 71 to rotate.

A rotating member 33 is connected to one end of the mounting pole 71. When the mounting pole 71 rotates, it drives the rotating member 33 to rotate, the rotating member 33 then drives the second stimulation module 60 to move reciprocally along the sliding guide 61. Specifically, when the fourth meshing member 711 is rotated by the drive of the third meshing member 69, the mounting pole 71 connected to the fourth meshing member 711 is driven to rotate. Simultaneously, the rotating member 33 on the mounting pole 71 take to rotate together, then drives the second stimulation module 60 to slide. More specifically, under the drive of the second motor 38, the output shaft 311 drives the first meshing member 65 to rotate. The second meshing member 67, which meshes with the first meshing member 65, also rotates. Driven by the second meshing member 67, the third meshing member 69 connected to the end of the second meshing member 67 rotates synchronously. The fourth meshing member 711, which meshes with the third meshing member 69, also rotates accordingly. Since the fourth meshing member 711 is connected to the mounting pole 71, when the fourth meshing member 711 rotates, the erection column 71 rotates synchronously. The rotating member 33 is connected to one end of the mounting pole 71, and as the mounting pole 71 rotates, the rotating member 33 also rotates, thereby providing the driving force for the second stimulation module 60.

Figure 13:
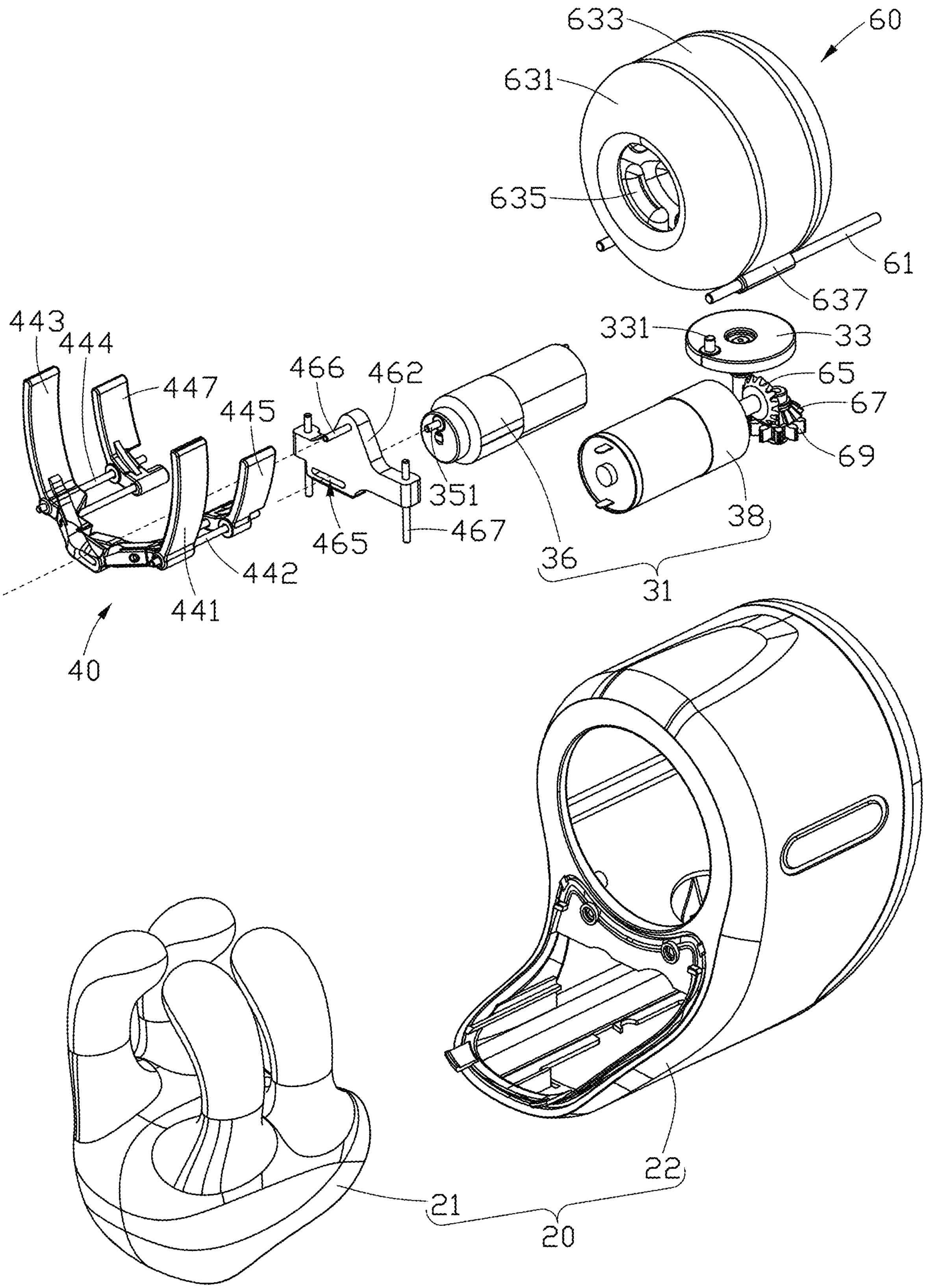
FIG. 13 is an exploded view of the sexual stimulation device shown in FIG. 9.
Figure 14:
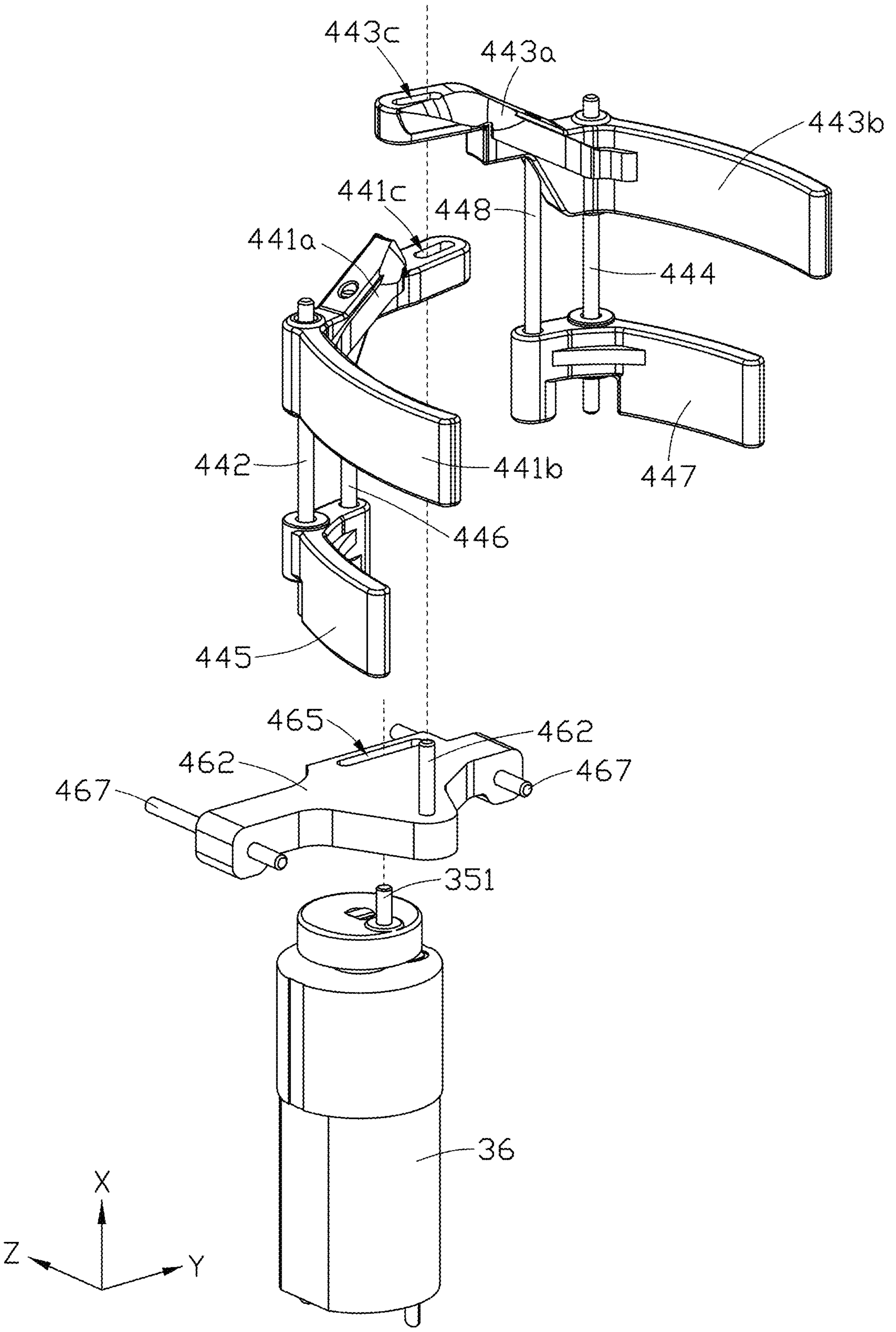
FIG. 14 is an exploded view of a driving unit and a first stimulation of the sexual stimulation device shown in FIG. 13 showing from another viewing direction.

Refer to FIG. 13 and FIG. 14, in this embodiment, there are also a third swinging piece 445 and a fourth swinging piece 447 arranged symmetrically to each other and between the first and the second swinging pieces and the second stimulation module 60. Both the third and fourth swinging pieces are smaller than that of the first and second swinging pieces.

The third swinging piece 445 is rotatably connected to the first housing body 21 via a first pivot 442. One end of the third swinging piece 445 is fixedly connected to the first connecting arm 441*a* of the first swinging piece 441 through a third pivot 446, enabling the third swinging piece 445 to swing together with the first swinging piece 441 around the first pivot 442. Under the drive of the rotary shaft 351, the driving shaft 466 drives the first, second, and third swinging pieces 441, 443, and 445 to simultaneously move downwardly or upwardly.

In this embodiment, the structure of the fourth swinging piece 447 is the same as the third swinging piece 445. The fourth swinging piece 445 is rotatably connected to the first housing body 21 via a second pivot 444. One end of the fourth swinging piece 447 is fixedly connected to the second connecting arm 443*a* of the second swinging piece 443 via the fourth pivot 448, enabling the fourth swinging piece 447 to swing together with the second swinging piece 443 around the second pivot 444. As the rotary shaft 351 drives the sliding block 462 to move up and down along the guide shaft 467, the driving shaft 466 simultaneously moves the first, second, third, and fourth swinging pieces 441, 443, 445, and 447 toward or away from each other, achieving clamping and swinging massage effects.

Similarly, an accommodation space 47 that is capable of accommodating the penis is defined among the first, second, third, and fourth swing pieces 441, 443, 445, and 447. When the penis is accommodated in the accommodation space 47, the four swinging pieces 441, 443, 445, and 447 move towards or away from the penis under the driven by the driving member 31, thereby achieving clamping and tapping effects.

Figure 9:
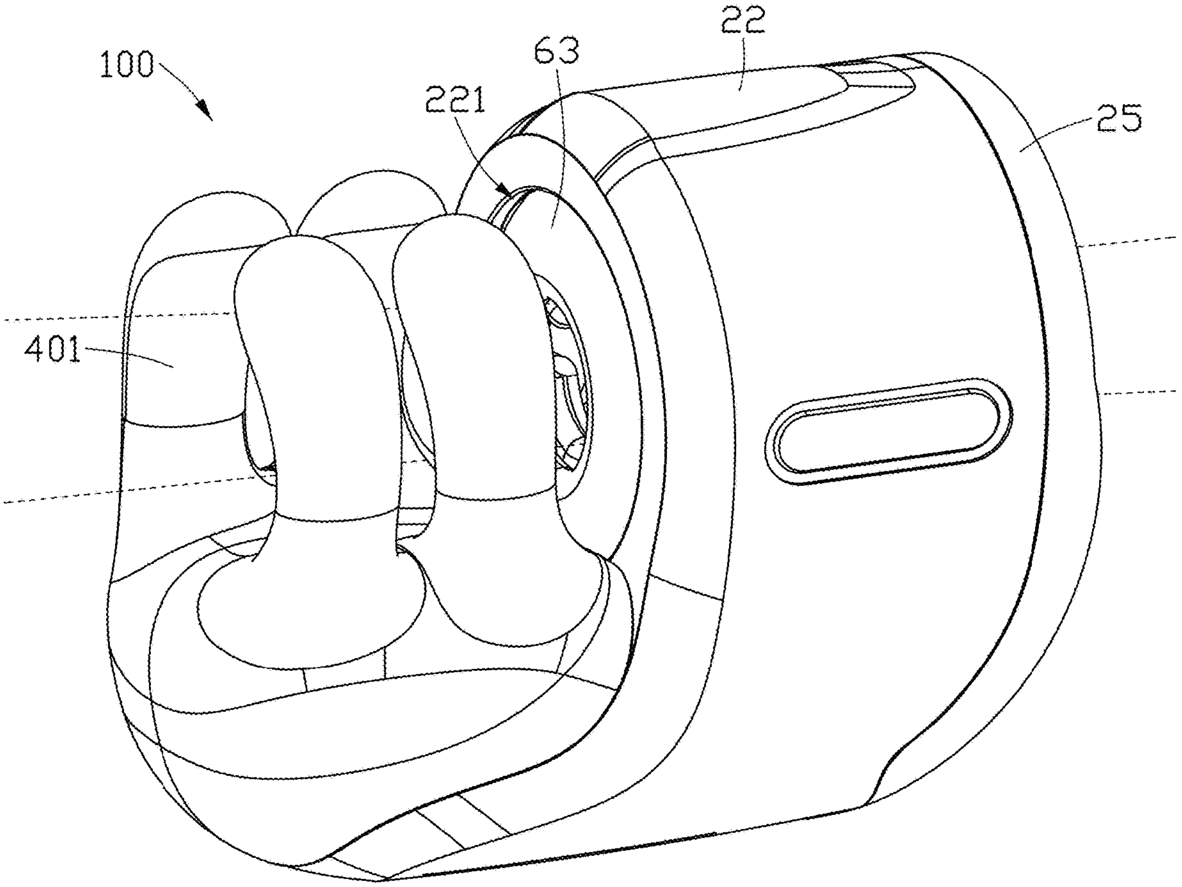
FIG. 9 is a perspective view of a sexual stimulation device according to a second embodiment of the present disclosure.
Figure 10:
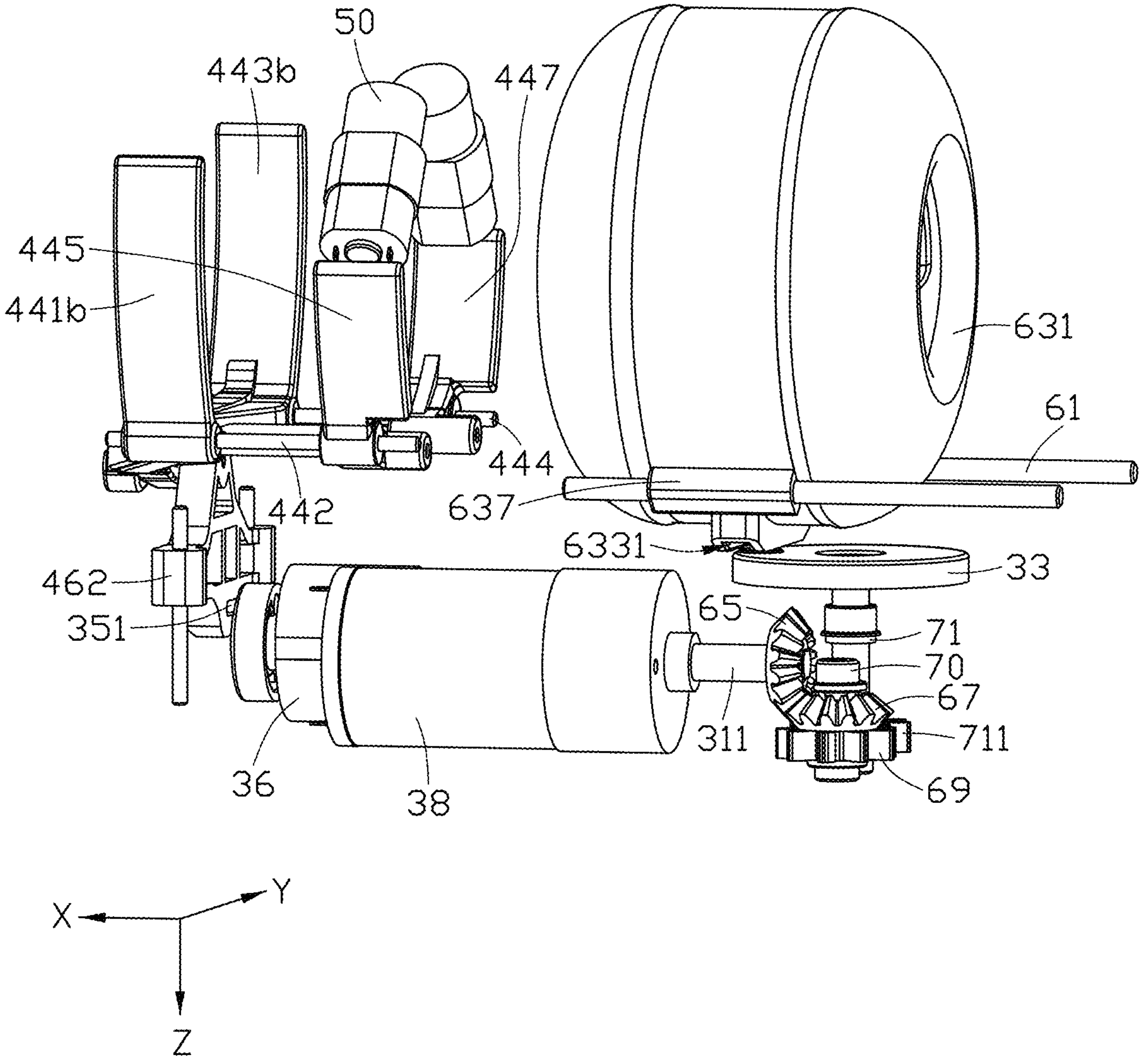
FIG. 10 is a perspective view of the sexual stimulation device of the present disclosure shown in FIG. 9 with a housing being removed.
Figure 11:
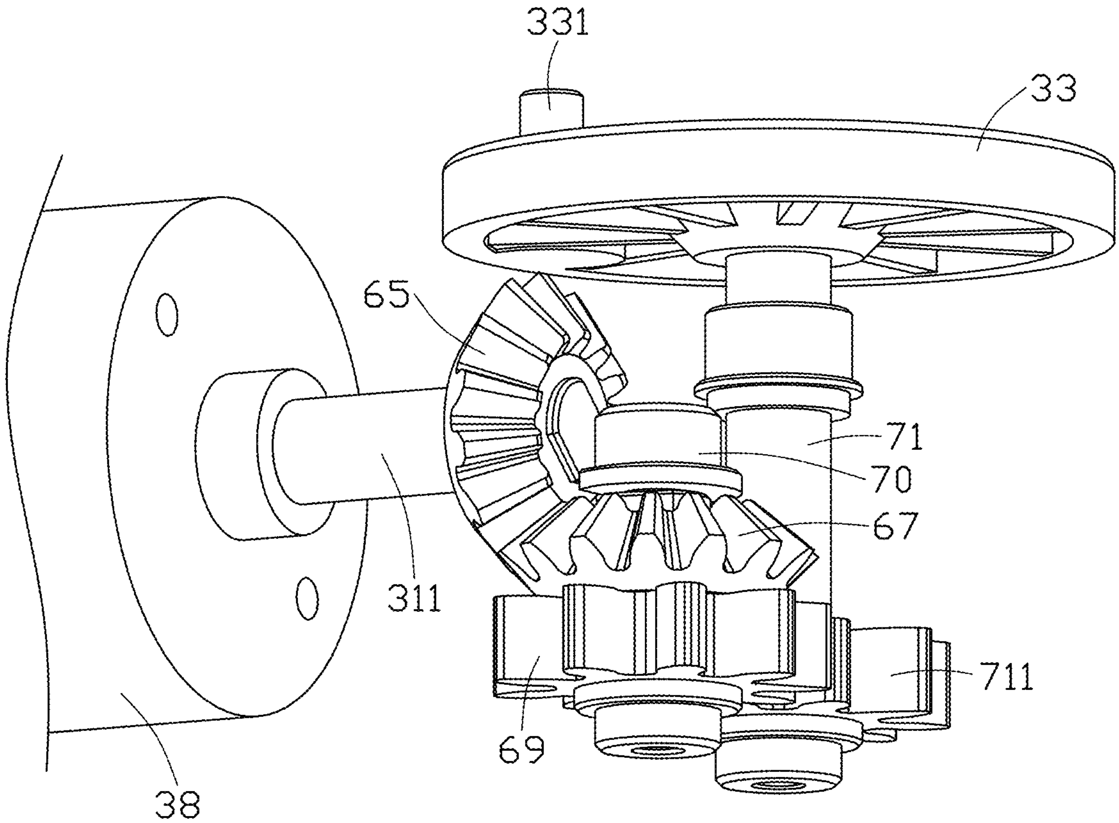
FIG. 11 is an enlarged view of a meshing structure of the sexual stimulation device shown in FIG. 10.
Figure 12:
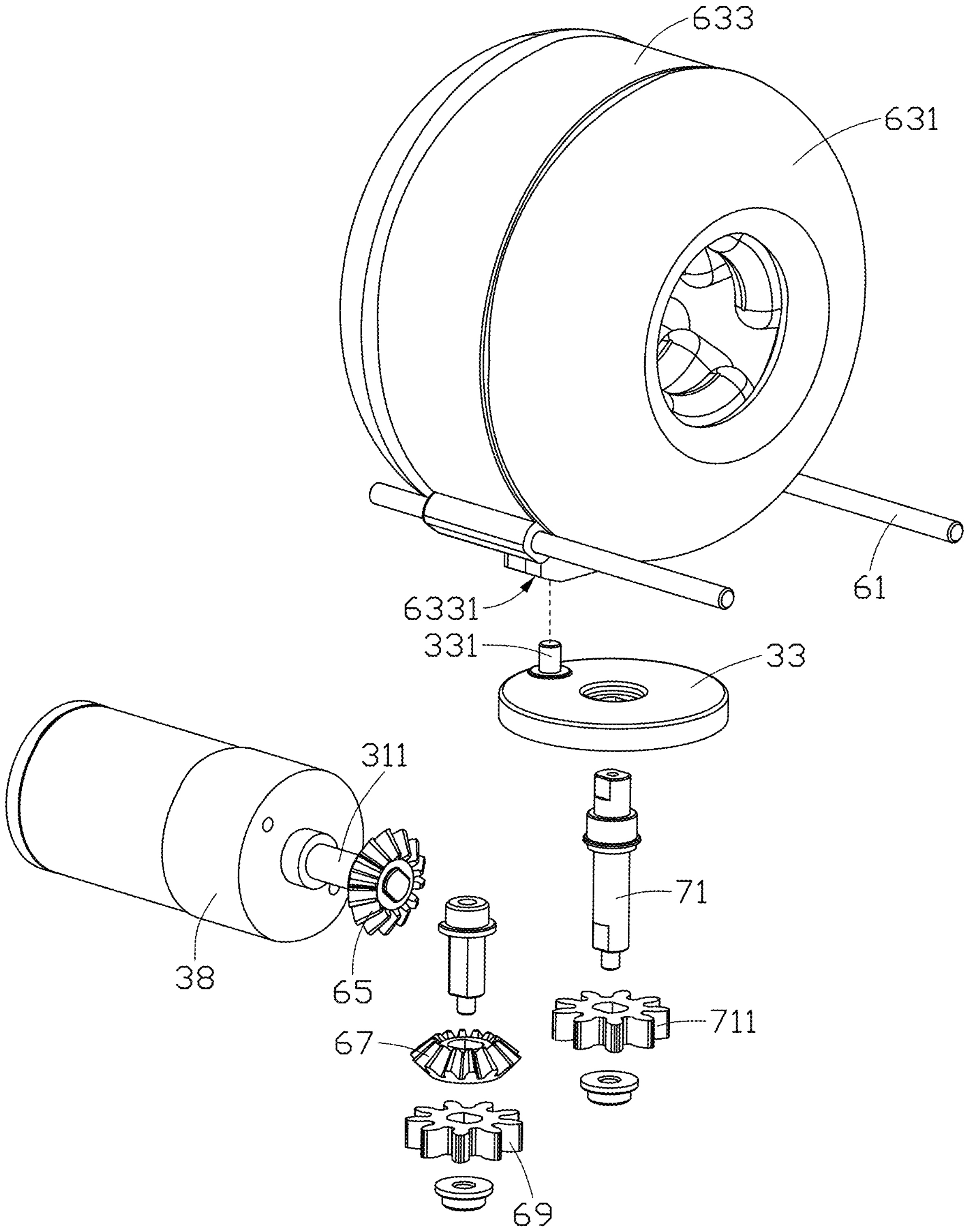
FIG. 12 is an exploded view of the meshing structure of the sexual stimulation device shown in FIG. 10.

Protective covers 401 are provided to cover the third and fourth swinging pieces 445 and 447 (refer to FIG. 9). A vibration unit 50 may also disposed at the top of the third and fourth swinging pieces 445 and 447 and covered by the protective covers 401. In this embodiment, the vibration unit 50 is a vibration motor. The first and the second swinging pieces 441 and 443 are not equipped with vibration motors, whereas the ends of the third and fourth swinging pieces 445 and 447 are equipped with vibration motors. This arrangement allows the third and fourth swinging pieces 445 and 447 to vibrate while swinging, thereby enhancing the massage experience.

Third Embodiment

Figure 15:
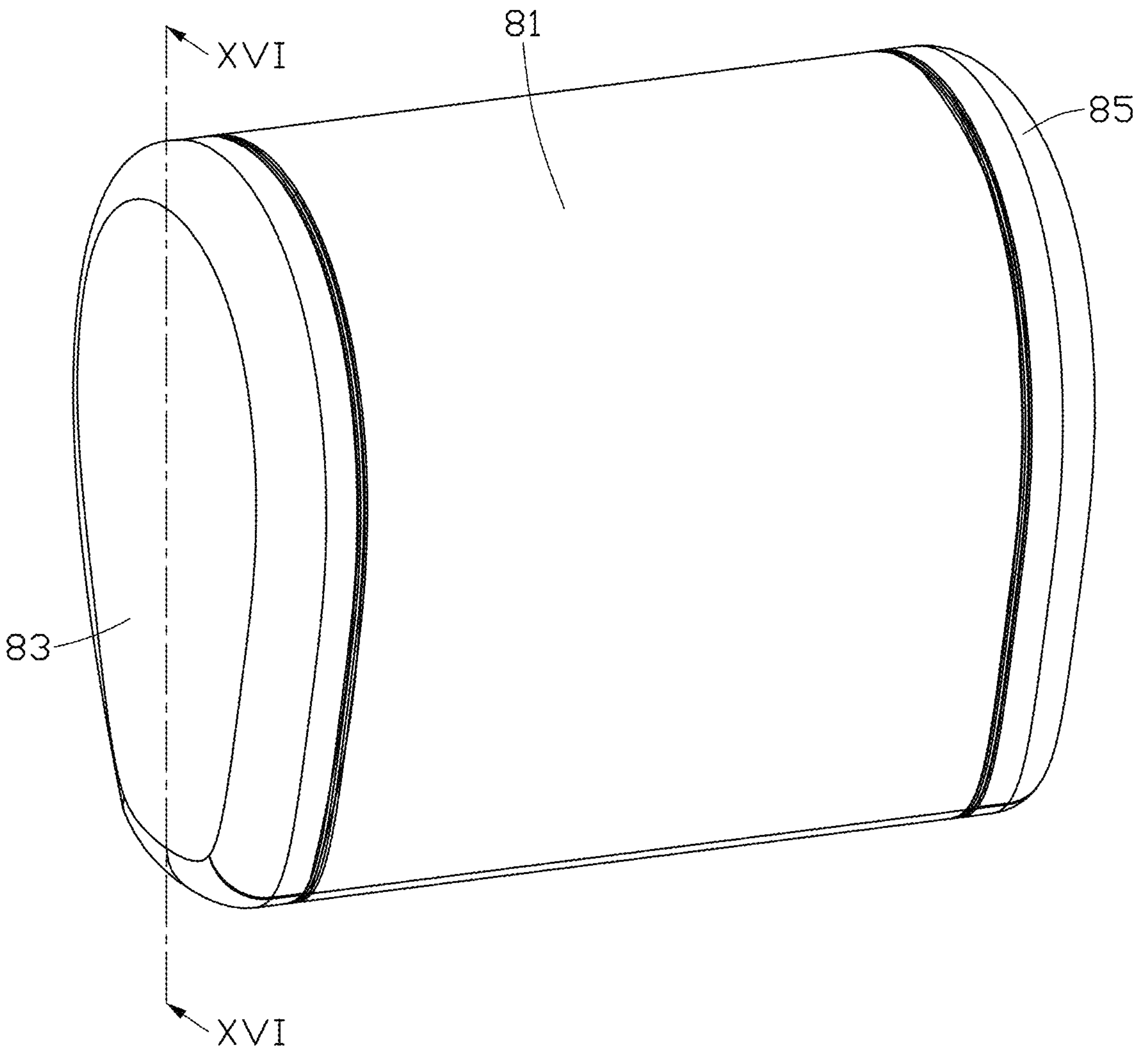
FIG. 15 is a perspective view of a sexual stimulation device according to a third embodiment of the present disclosure.
Figure 16:
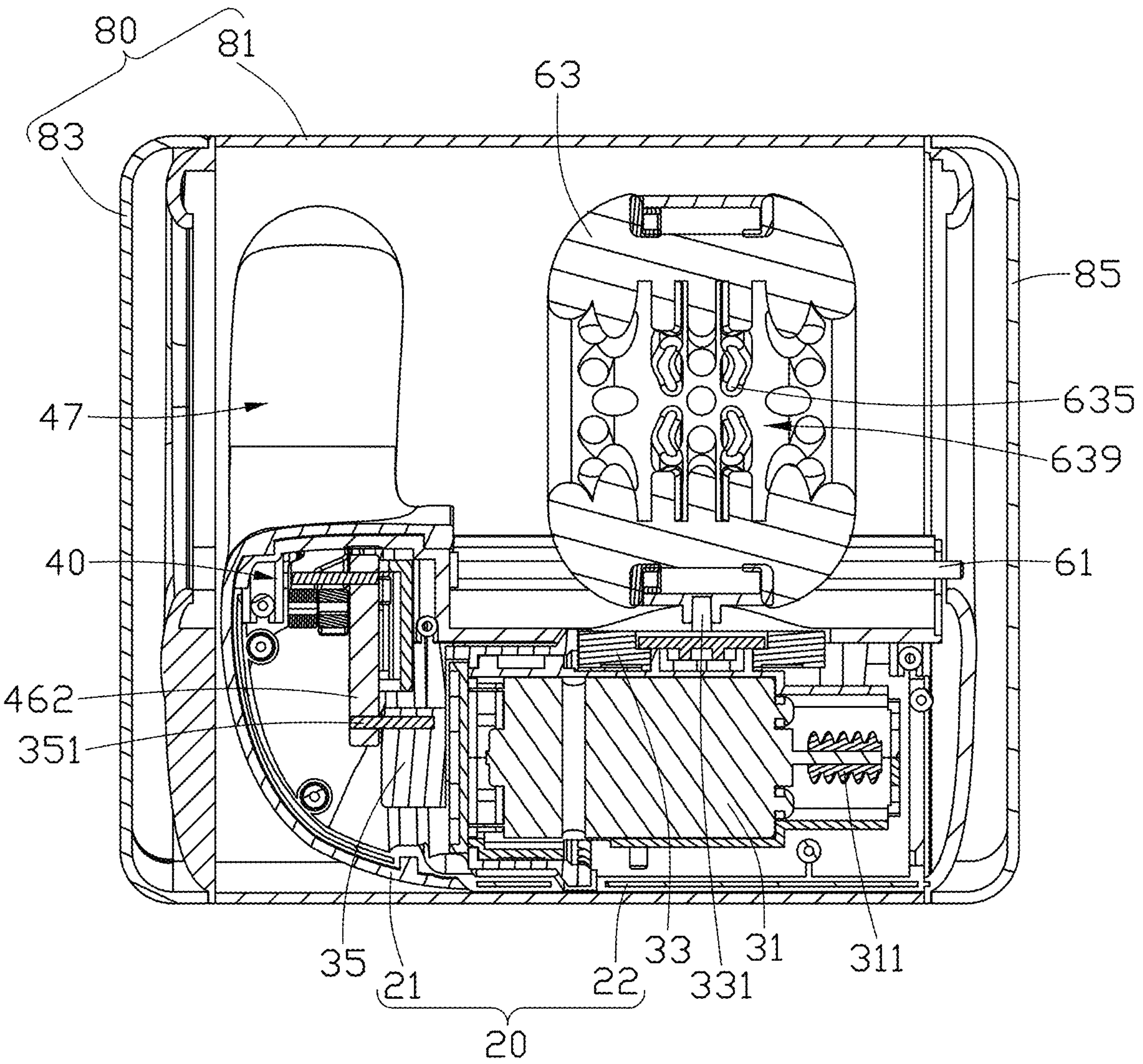
FIG. 16 is a cross-sectional view of the sexual stimulation device shown in FIG. 15.

Refer to FIG. 15 to FIG. 16, the sexual stimulation device 100 of the third embodiment differs from the sexual stimulation device 100 of the first embodiment at the outer surface of the housing. In this embodiment, there is a shell 80 that covers the exterior surface of the sexual stimulation device 100 so as to protecting it from external dust contamination.

The shell 80 covers both the first housing body 21 and the second housing body 22. Specifically, the shell 80 comprises a main body 81, a first side body 83, and a second side body 85. The first side body 83 and the second side body 85 are detachably attached to opposite sides of the main body 81 by snap-fitting, adhesion, or magnetic attraction mechanisms.

The main body 81 is made of soft silicone material. The first housing body 21, the second housing body 22, as well as the first and second swinging pieces 441 and 443 are fully received in the main body 81. More specifically, an inner sidewall of the main body 81 is spaced away the first swinging piece 441 and the second swinging piece 443, allowing the first and second swinging piece s 441 and 443 to swing freely without the limitation of the main body 81. It means that the penis can be stimulated without to remove the main body 81 during using the sexual stimulation device.

The first and second side bodies 83 and 85 are configured to function as covers. The first side body 83 covers the side of the first stimulation module 40 away from the second stimulation module 60, with closing the accommodation space 47. The second side body 85 covers the side of the second stimulation module 60 away from the first stimulation module 40, with closing the massage space 639. In use, anyone of the first or/and second side body 83 and 85 is capable of being opened for inserting the penis.

What is claimed is:

1. A sexual stimulation device comprising:

a first stimulation module and a second stimulation module arranged along an imaginary line and cooperatively defining an insertion space configured to receive a penis, the first stimulation module configured for stimulating a first area of the penis at a first stimulating direction, and the second stimulation module configured for stimulating a second area of the penis at a second stimulating direction, the second stimulation module disposed at a side of the first stimulation module, the second area not overlapping the first area, the first stimulating direction being different from the second stimulating direction, wherein a first insertion hole is defined in one of the first stimulation module and the second stimulation module, the first insertion hole is communicating with the insertion space, the first insertion hole is configured such that the insertion space receives the penis through the insertion hole;

the first stimulation module comprises at least two swinging pieces, the at least two swinging pieces are arranged opposite each other and spaced from each other, such that an accommodation space is defined between the at least two swinging pieces, the accommodation space is further defined within the insertion space and is configured to receive a part of the penis when the first stimulation module receives the penis, the second stimulation module including a cylindrical part, an inner wall of the cylindrical part defining a surrounding surface which defines a massage space configured to accommodate another part of the penis, a soft material located on the surrounding surface and configured to wrap around the another part of the penis when the second stimulation module receives the penis;

the accommodation space communicates with the massage space, and the massage space and the accommodation space together to define the insertion space.

2. The sexual stimulation device according to claim 1, wherein a gap is defined between the first stimulation module and the second stimulation module along the imaginary line; the first insertion hole is defined at an end of the first stimulation module which is furthest away from the second stimulation module, a insertion pathway is defined from the first insertion hole, the first stimulation module, the gap, and the second stimulation module.

3. The sexual stimulation device according to claim 2, wherein a second insertion hole is defined in an end of the second stimulation module which is furthest away from the first stimulation module, the first insertion hole and the second insertion hole are arranged at opposite sides of the sexual stimulation device, the first and the second insertion holes are co-axial in the imaginary line, and the second insertion hole is air communicated with the insertion space.

4. The sexual stimulation device according to claim 1, wherein each of the at least two swinging pieces is curvedly extended, the at least two swinging pieces cooperatively form an inner wall of the accommodation space, a shape of the inner wall of the accommodation space is configured to fit a shape of the portion of the penis in the first stimulation module.

5. The sexual stimulation device according to claim 4, wherein the at least two swinging pieces comprises a first swinging piece and a second swinging piece, each of the first swinging piece and the second swinging piece is driven and switched reciprocally between a first motion mode and a second motion mode, in the first motion mode, the first swinging piece and the second swinging piece are driven to move towards each other to compress the accommodation space and grip the portion of the penis, and in the second motion mode, the first swinging piece and the second swinging piece are driven to move away from each other to expand the accommodation space and release the portion of the penis.

6. The sexual stimulation device according to claim 5, wherein a movement pathway of each of the first and the second swinging pieces of the first stimulation module is perpendicular to the imaginary line.

7. The sexual stimulation device according to claim 1, further comprising a housing configured to arrange the first stimulation module and the second stimulation module, wherein the housing comprises a first housing body; a second housing body beside the first housing, and a channel penetrating the second housing body along the imaginary line and extending into the first housing body, the first stimulation module is movably received in the first housing body, the second stimulation module is movably received in the second housing body, and the insertion space is further defined within the channel.

8. The sexual stimulation device according to claim 7, wherein the housing further comprises a cover detachably installed on a distal end of the second housing body, the distal end is away from the first housing body, an opening is defined in the cover, the opening is air communicated with the channel of the second housing body, and the opening and the channel are co-axial in the imaginary line.

9. A sexual stimulation device comprising:

a housing, a first stimulation module comprising a pair of first swinging pieces, and, a second stimulation module comprising a cylindrical part, an inner wall of the cylindrical part defining a stimulating surface which defines a massage space, the stimulating surface configured for contacting and stimulating a to-be-stimulated body inserted into the massage space, and a soft material located on the stimulating surface and configured to wrap around the to-be-stimulated body when the second stimulation module receives the to-be-stimulated body;

wherein the pair of first swinging pieces of the first stimulation module are driven to move toward or away from each other reciprocally, and the second stimulation module is driven to slide reciprocally toward or away from the first stimulation module.

10. The sexual stimulation device according to claim 9, wherein the pair of first swinging pieces are curved towards each other to form an arc, so that an accommodation space which is configured for accommodating a portion of a penis is defined by curvatures of the pair of first swinging pieces, the massage space is defined in the second stimulation module and configured for accommodating another portion of the penis, the accommodation space is air communicated with the massage space, the first stimulation module further comprises a pair of second swinging pieces aligned with the pair of first swinging pieces, the pair of second swinging pieces is disposed between the pair of first swinging pieces and the second stimulation module, sizes of the pair of second swinging pieces being different from sizes of the pair of first swinging pieces.

11. The sexual stimulation device according to claim 10, wherein a first entrance is defined at a side of the accommodation space which is away from the massage space, a first insertion pathway is formed from the first entrance, the accommodation space and to the massage space, a second entrance is defined at a side of the message space which is away from the accommodation space, a second insertion pathway is formed from the second entrance, the massage space and to the accommodation space.

12. The sexual stimulation device according to claim 11, wherein the second stimulation module comprises a sliding guide fixedly connected to the housing; the cylindrical part is slidably connected to the sliding guide.

13. The sexual stimulation device according to claim 12, further comprising a motor, wherein the motor comprises an output shaft connected to a gear wheel; and the gear wheel is connected to the cylindrical part of the second stimulation module, so that the cylindrical part is reciprocally slidable along a length direction of the housing when the cylindrical part is driven by the motor;

wherein the gear wheel is meshed with a gear structure of a transmission member, and one end of the transmission member is coupled to a rotating shaft, which is connected to the pair of first swinging pieces of the first stimulation module; such that the pair of first swinging pieces and the cylindrical part are driven by the motor.

14. The sexual stimulation device according to claim 10, wherein the pair of first swinging pieces is covered with a pair of protective covers, a hardness of the pair of protective covers is lesser than a hardness of the pair of the first swinging pieces, the protective covers are switchable between a first state and a second state, wherein the protective covers contact with each other in the first state, and the protective covers are spaced apart in the second state.

15. The sexual stimulation device according to claim 10, wherein a motor is accommodated in one of the accommodation space of the first stimulation module and the massage space of the second stimulation module, the motor is configured for providing vibration stimulations for the penis.

16. The sexual stimulation device according to claim 9, further comprising a first driving member and a second driving member, the first driving member comprises a first motor and a rotating shaft connected to the first motor, and the rotating shaft is connected to the first stimulation module and configured for driving the first stimulation module to swing reciprocally;

the second driving member comprises a second motor and an output shaft connected to the second motor, the output shaft is connected to a first meshing member; the second stimulation module comprises a meshing structure meshing with the first meshing member, so that when the second stimulation module is driven by the second motor , the second stimulation module slides reciprocally.

17. The sexual stimulation device according to claim 16, wherein the second stimulation module further comprises a bevel gear, the bevel gear meshes with the first meshing member, when the bevel gear rotates, the second stimulation module is driven to slide along a length direction of the housing when the second motor is switched on.

18. The sexual stimulation device according to claim 9, wherein the housing comprises a first housing body and a second housing body, the first housing body protrudes and extends from one side of the second housing body, and a bottom of the first housing body and a bottom of the second housing body are interconnected cooperatively to define a receiving space;

a first opening is defined on a top side of the first housing body, and is air communicating with the receiving space, and the pair of first swinging pieces of the first stimulation module is extended outwardly through the first opening;

the second stimulation module is slidably received in the second housing body, the first stimulation module is installed exterior to the second housing body.

19. A sexual stimulation device comprising:

at least two swinging pieces arranged opposite each other and spaced from each other, such that an accommodation space is defined between the at least two swinging pieces, the accommodation space configured to receive a first area of the penis when receiving a penis, the accommodation space configured to receive a first area of the penis when receiving a penis, and to stimulate a first area of a penis from a first stimulating direction; and a cylindrical stimulation module configured for stimulating a second area of the penis from a second stimulating direction, wherein the cylindrical stimulation module is disposed at a side of the at least two swinging pieces, the second area does not overlap with the first area, the first stimulating direction is different to the second stimulating direction;

the at least two swinging pieces and the cylindrical stimulation module are arranged along an imaginary line, the second stimulating direction is parallel to the imaginary line, and the second stimulating direction is perpendicular to the first stimulating direction;

the cylindrical stimulation module comprises a sliding guide and a housing slidably connected to the sliding guide; an inner wall of the housing defines a surrounding surface which defines a massage space configured to accommodate the second area of the penis, a soft material located on the surrounding surface and configured to wrap around the second area of the penis when the cylindrical stimulation module receives the penis; and the housing with the soft material is driven to slide reciprocally toward or away from the at least two swinging pieces, the massage space is in air communication with the accommodation space.

* * * * *